United States Patent [19]

De Bortoli et al.

[11] E Re. 29,371

[45] Reissued Aug. 23, 1977

[54] CONNECTING BLOCK

[75] Inventors: George De Bortoli, Ottawa; Helmut Hans Lukas, Carleton Place, both of Canada

[73] Assignee: Northern Electric Company Limited, Montreal, Canada

[21] Appl. No.: 647,538

[22] Filed: Jan. 8, 1976

Related U.S. Patent Documents

Reissue of:

[64] Patent No.: 3,784,728
Issued: Jan. 8, 1974
Appl. No.: 308,054
Filed: Nov. 20, 1972

[51] Int. Cl.[2] ..... H01R 13/46

[52] U.S. Cl. ..... 174/60; 339/18 B; 179/98; 361/426; 361/428

[58] Field of Search ..... 174/59, 60; 339/18 B, 339/125 R, 198 J, 198 R; 179/98; 317/99, 101 D, 101 DH, 101 CX, 118, 120, 122

[56] References Cited

U.S. PATENT DOCUMENTS

| | | | |
|---|---|---|---|
| 522,664 | 7/1894 | Kleinsteuber | 174/60 |
| 2,098,321 | 11/1937 | Treplow | 317/122 |
| 2,219,887 | 10/1940 | Bowly | 179/98 |
| 3,112,147 | 11/1963 | Pferd | 339/198 R |
| 3,166,369 | 1/1965 | Trump | 339/18 B |
| 3,170,746 | 2/1965 | Aksu | 339/18 B |
| 3,376,542 | 4/1968 | Vlaminck | 174/60 |
| 3,666,996 | 5/1972 | Brown | 317/118 |

*Primary Examiner*—Gerald P. Tolin
*Attorney, Agent, or Firm*—Sidney T. Jelly

[57] ABSTRACT

A connecting block in which a support member has a large number of terminal clips extending through the member, for connection of wires to both ends, the support member pivotally mounted in a housing so that one or other side of the support member, and related ends of terminal clips, can be selectively presented for wiring. A hinged cover attached to the support member can be utilized to retain the support member in one selected position, the support member normally positioned in the other position, as by gravity.

8 Claims, 6 Drawing Figures

CONNECTING BLOCK

Matter enclosed in heavy brackets [ ] appears in the original patent but forms no part of this reissue specification; matter printed in italics indicates the additions made by reissue.

This invention relates to connecting blocks, particularly to connecting blocks for telephone installations.

In present arrangements connecting blocks are usually open and comprise an insulating support member in which are mounted the terminals or clips to which wires are attached. The member is fixed and it is not easy to obtain working access to both sides of the member — which is a necessity as wires are connected to the terminals or clips at both ends. Work on an adjacent block can result in damage, such as breaking or loosening of connections. With present constructions there are space limitations, largely because of the difficulty in providing reasonable access to the terminals.

The present invention provides a connecting block in which the support member is pivotally mounted in a housing, enabling easy access to both sides of the member. The support member can be enclosed to provide protection to the terminals or clips. The wires can be lead into the connecting block housing through clamping devices and fanning or spreading arrays, providing a high degree of protection to the wires plus ready identification and location of particular wires with the related terminal or clip.

These and other advantages will be evident from the following description of a particular embodiment, by way of example, in conjunction with the accompanying drawings, in which.

Figure 1:
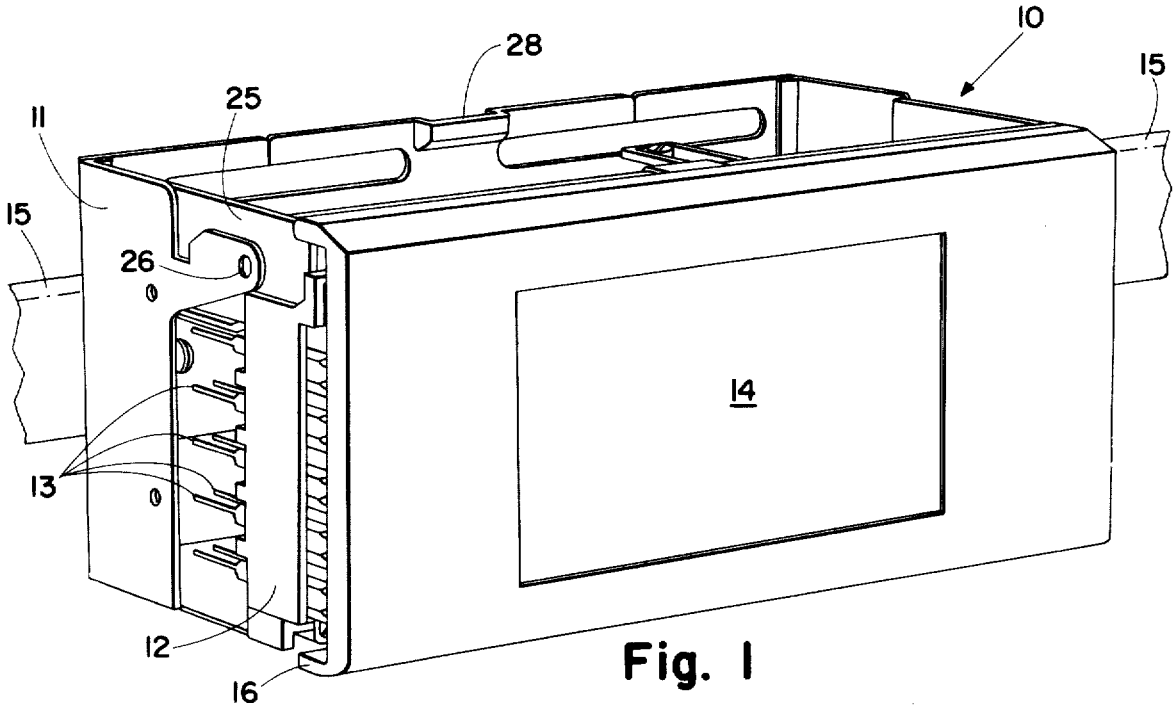
FIG. 1 is a perspective view of a connecting block, in accordance with the present invention, mounted on a frame member.

As illustrated in FIGS. 1 to 5, a connecting block, indicated generally at 10, comprises a housing 11, a support member 12 holding a plurality of terminal clips 13, and a cover 14. The block 10 is normally mounted on a frame member 15 when in use. Frame member 15 is part of a frame in a telephone exchange for example.

In FIG. 1, the whole connecting block assembly is in a closed condition, with no connection made to the terminal clips. In the example illustrated, the cover 14, which forms the front surface of the block when in the closed condition, is hinged at its lower edge 16. These hinges are seen at 17 in FIG. 2. The cover can be slightly recessed as shown, to receive some form of designation marking. Similar marking can be applied on the inside of the cover. The hinges 17, in the example illustrated in FIG. 1, are separate items attached to the cover 14 and to the support member 12, and are of flexible plastic material. The hinges have a transverse portion 18 of reduced thickness which provides the hinging action.

As will be seen, ready access is provided to the front ends, or beams, of the terminal clips 13. The clips 13, in the example described, each accept two wires. The wires to be connected to the front ends of the clips 13 are brought through slots 20 formed at the top of the back of the housing 11. In the present example two slots are provided and it is possible to pull wires down into the slots 20 through small gaps 21. The wires are also positioned further in a series of slots 22, a slot for each column of clips 13. The wires are again positioned in the slots 22 by pulling through a small gap 23 provided for each slot.

Figure 2:
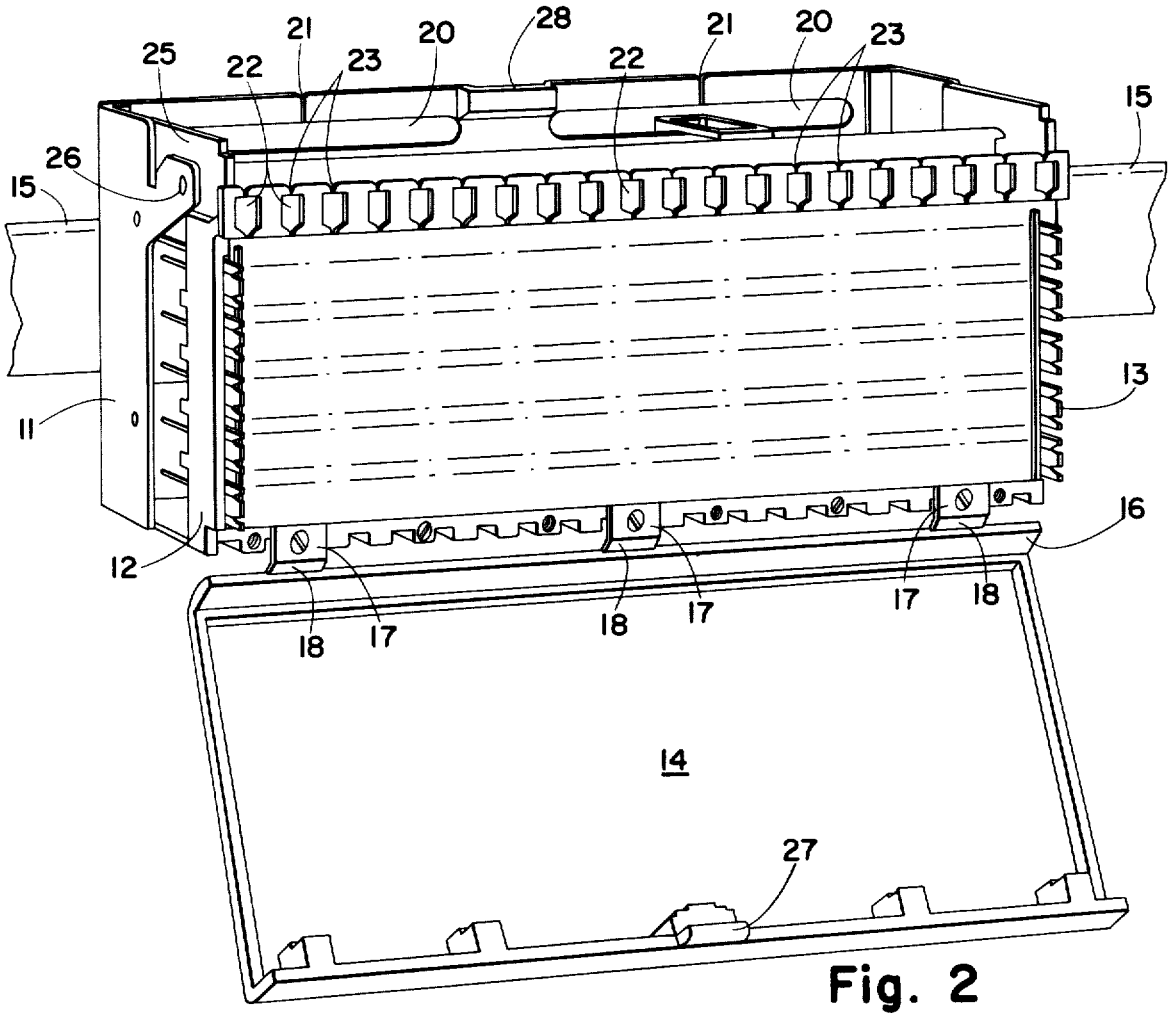
FIG. 2 is a similar view of the block of FIG. 1, with the cover opened to show the support member with clips.
Figure 3:
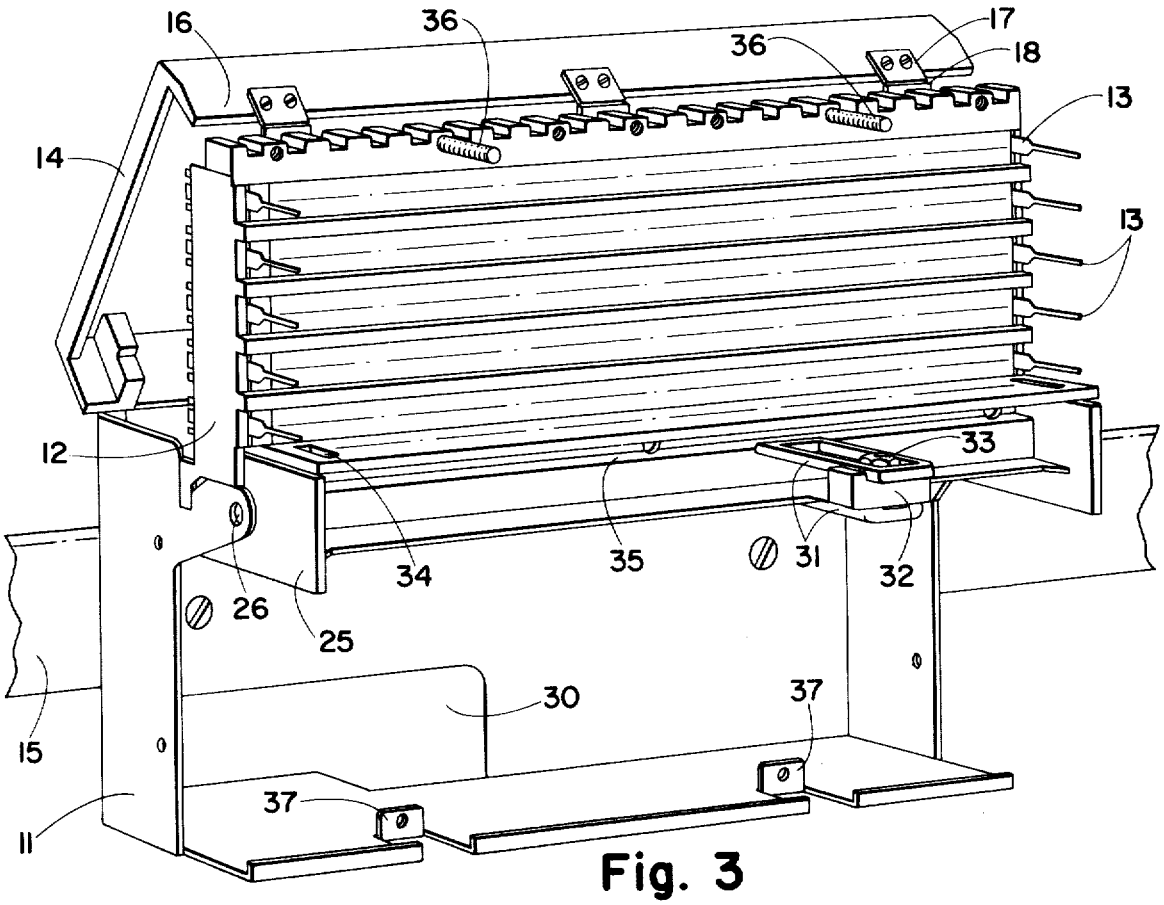
FIG. 3 is a further similar view of the block of FIG. 1, showing the support member pivoted to provide access to the rear side.

The clips 13 are held in the support member and the support member is carried by a frame 25 which is in turn pivotally attached to the housing 11 by pivots 26. By this means it is possible to pivot the support member upwards, to a position as seen in FIG. 3. The support member can be retained in this position by the cover 14 being carried over and back with a projection on the cover engaging with a recess on the housing. The projection is seen at 27 in FIG. 2 and the recess is seen at 28 in FIGS. 1 and 2.

By pivoting the support member to the position seen in FIG. 3, easy access is provided to the rear or back ends of the terminal clips 13. In the present example these rear ends are adapted to the making of connections by wire wrapping. The wires are fed through the back of the housing, through aperture 30, FIG. 3, and then through a further aperture defined by two members 31.

A clamping member 32 slides in slots formed in the member 31, being held in any desired position by a screw 33. The clamping member 32 can be adjusted along the slots to clamp the wires passing through the aperture defined by the members 31. Thus varying quantities of wires can be accommodated. This clamping also acts as a strain relief to avoid strain being placed on the wires to the terminal clips. The members 31 can be spread apart by completely removing the screw 33, and, if desired, one of the members 31, for example the top one in FIG. 3, can be completely removable. Individual wires are then fed through slots 34 in a fanning strip 35, seen more clearly in FIG. 4. There is a slot 34 for each column of clips 13.

Figure 4:
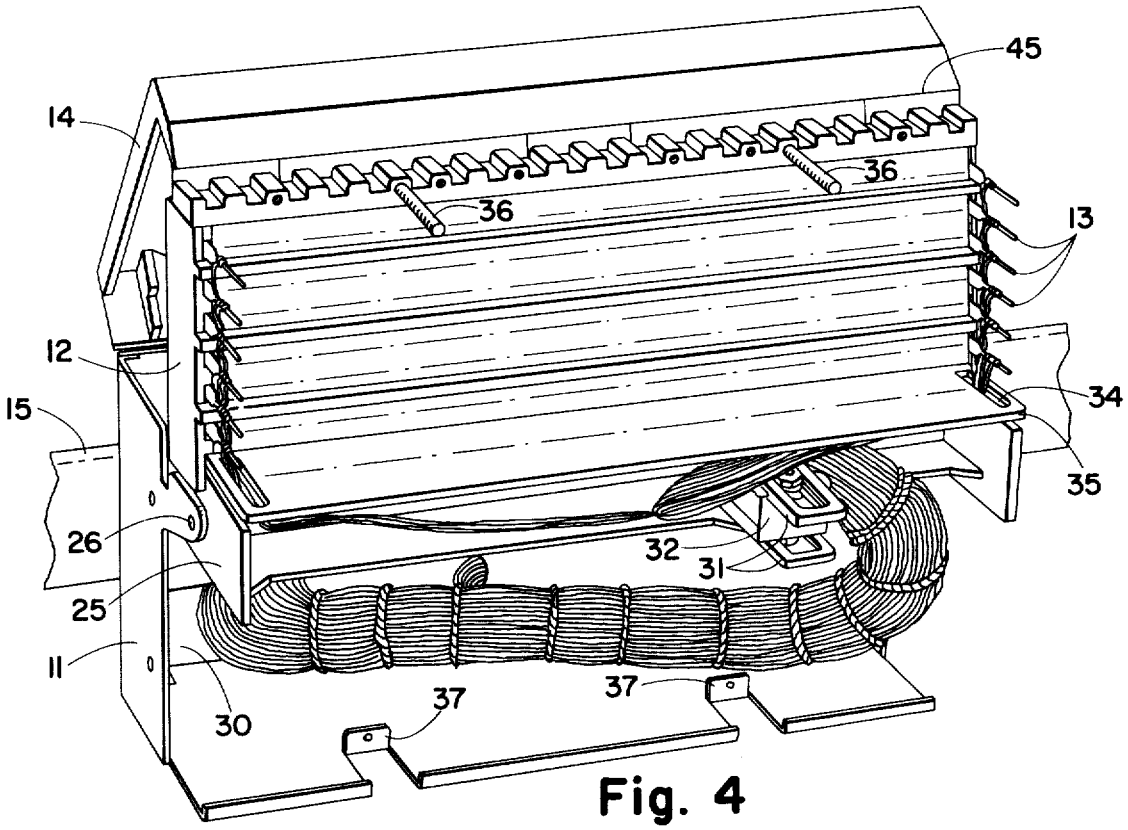
FIG. 4 is a view similar to that of FIG. 3, but indicating the wiring of a block.
Figure 5:
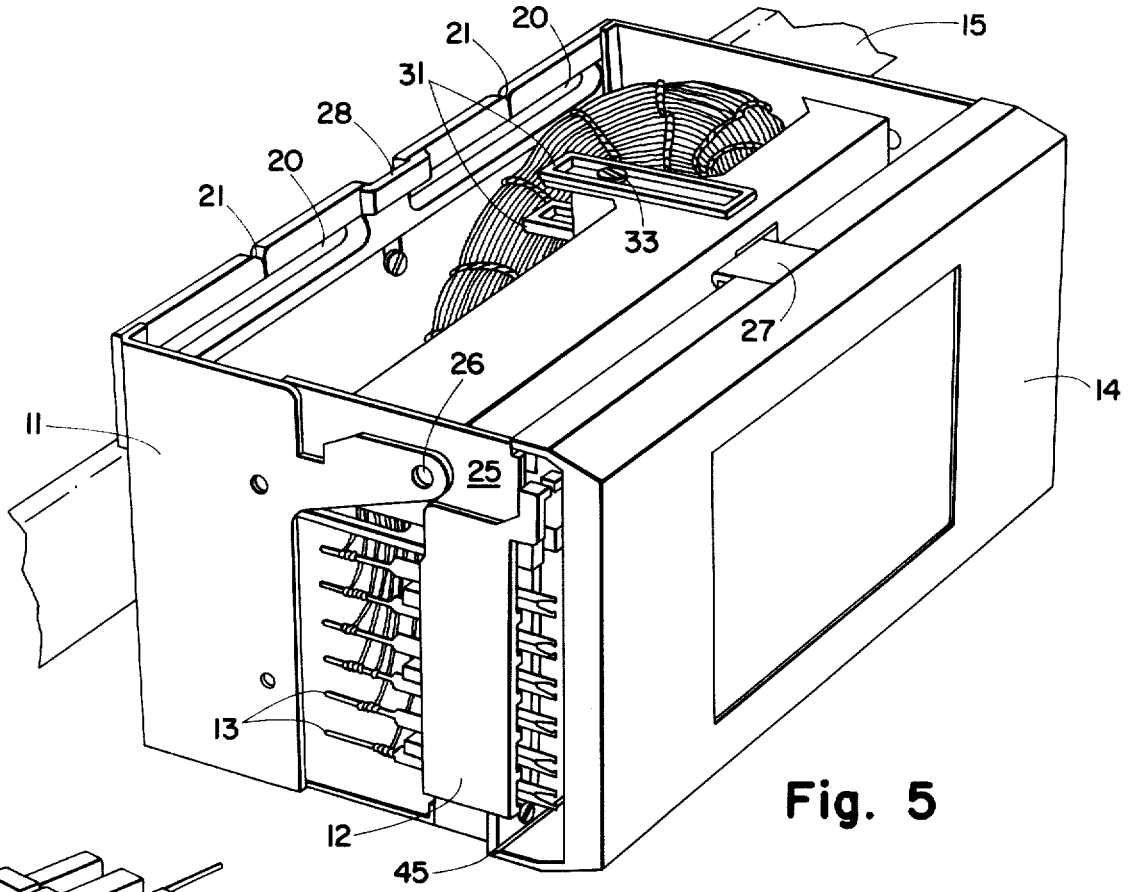
FIG. 5 is a view of a connecting block closed, as in FIG. 1, but at a different angle to show the position of the wires.

After wiring of the clips at the rear of the support member, the member can be pivoted down. It is held in place by screws 36 engaging in threaded lugs 37 (FIGS. 3 and 4). FIG. 5 shows a connecting block in which the rear ends of the terminal clips have been wired. It will be seen that all the wiring is contained within the block and is protected.

The support member and the clips carried thereby can readily be changed. The support member can be removed by detaching the frame 25 at the pivots 26. A support member of similar form or of another form can be replaced in the housing. Thus support members with clips having three legs, as seen in FIG. 2 can be used, or an alternative form support member with clips having two legs can be used — as seen in FIG. 5.

Figure 6:
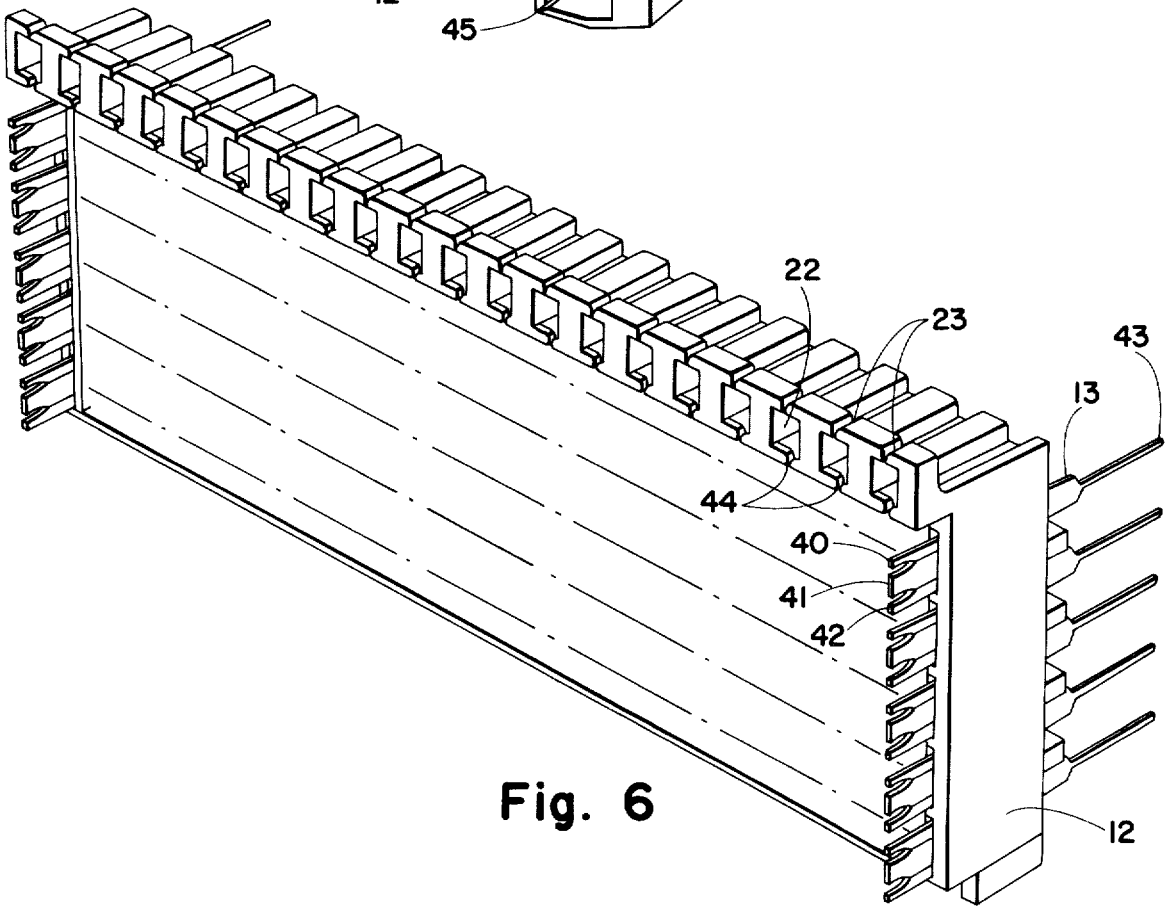
FIG. 6 is a perspective view of one form of support member and clips.

FIG. 6 illustrates one form of a support member 12 having terminal clips 13 with the three legs or beams 40, 41 and 42 at the front ends. The rear ends 43 are of a form acceptable for wire wrapping. The support member 12 is of moulded plastic material. The slots 22 with gaps 23 are clearly seen in FIG. 6. Also seen in FIG. 6 is a further gap 44 below each slot 22. When wiring is being carried out, the wires for a particular column of terminal clips are pulled through the top gap 23 into the open central portion of the slot 22. The wires can remain in this slot after connection to a clip if only a temporary connection is being made. For a permanent connection, the wires can be pulled down into the gap 44.

The connecting block of the invention is of considerably different form as compared to conventional connecting blocks presently in use. The new block is very much more compact, a hundred pairs of terminal clips being provided in the space of 50 pairs in a conventional design. The block is self-contained and enclosed, the wires being protected and the terminal clips shielded with less likelihood of damage. The ability to pivot the support member, providing easy access to both ends of terminal clips, enables a reduction in size with closer spacing of clips, as the easy access makes it easier to make connections to individual clips. This ease of access also reduces the possibility of injury to the hands of those engaged on wiring the clips or checking the wiring. It is not necessary to pass hands between adjacent connecting blocks — as is the custom with present connecting blocks. This is because pivoting of the support member gives "front face" access to both sides of the support member.

The support member is held firmly in position by the screws [34] *36* when the front ends of the terminal clips are being wired. When released by unscrewing the screws [34] *36* and pivoted over, the support member can be held firmly in the new position by inter-engagement of the projection 27 on the cover 14 to recess 28 on the housing 11. However, the support member 12 can readily be removed and replaced by a support member of similar or different form. Conveniently the support member 12, frame 25 and cover 14 are removed as a unit at the pivots 26. By forming the housing in a metal material having some flexibility it is easy to remove a support member by simply flexing the sides of the housing to disengage the pivots. As an alternative the housing can be a plastic moulding, also having some flexibility.

In an alternative form of construction, the cover 14 is moulded with an integral hinge in the form of a strip which is attached to and forms part of the support member. Hinging of the cover is obtained by the flexing of a thin portion between cover and strip. This alternative is seen in FIGS. 4 and 5, the thin portion indicated at 45.

What is claimed is:

1. A connecting block for a telephone system, comprising:

a housing having a back member and two spaced apart side members extending forwardly from said back member, parallel to each other;

pivot means on forward ends of said side members;

a support member positioned between said side members, the support member having front and back faces;

pivot means on said support member at each end thereof and pivotally engaged with said pivot means on said side members, said support [members] *member* adapted to present said front and back faces alternatively in a forward facing direction;

a plurality of terminal clips extending through said support member, front ends of the terminal clips extending through the front face of the support member and back ends of the terminal clips extending through the back face of the support member;

a cover hingedly attached at its lower edge to a lower edge of said front face of said support member;

resilient clip means on an upper edge of said cover and engagement means on an upper edge of said front face of said support [means] *member*, the arrangement such that said resilient clip means engage with said engagement means when said front face of said support member is presented forward to retain said cover in position over said terminal clips;

stop means on said side members and said support [members] *member*, said stop means positioned to locate said support member in a predetermined position, said back face of the support member present in a forward direction; and interengaging means on said cover and said housing adapted to retain said support member in said predetermined position.

2. A connecting block as claimed in claim 1, said pivot means on said side members substantially aligned with an upper edge of said housing; said interengaging means on said cover and said housing comprising a resilient clip on the upper edge of said cover and a clip-receiving means on said upper edge of said housing.

3. A connecting block as claimed in claim 8, said pivot means disengageable whereby a support member can be removed from said housing and whereby a support member can be inserted in said housing.

4. A connecting block as claimed in claim 3, said housing of flexible material, said pivot means disengageable by flexing of said housing.

5. A connecting block as claimed in claim 8, said support members supporting said plurality of terminal clips in a series of columns, a series of slots formed in the support member at the front face thereof, a slot substantially aligned with each column of terminal clips; each slot including a central portion, a first gap providing initial access to the slot and a second gap leading from the central portion, the arrangement such that a wire can be pulled through the first gap into said central portion, and can further be pulled into the second gap from said central portion.

6. A connecting block as claimed in claim 5, including clamping means for wires passing to the support member, said clamping means including a member slidably adjustable to accommodate a variable number of wires.

7. A connecting block as claimed in claim 5, including a fanning member attached to said support member at the side thereof presenting said rear ends of said terminal clips, the fanning member including a slot for each column of terminal clips.

*8. A connecting block for a telephone system, comprising:*

*a housing having a back member and two spaced apart side members extending forwardly from said back member, parallel to each other, to form an open sided trough shaped member;*

*pivot means on forward ends of said side members at an upper part thereof;*

*a support member pivotally positioned between said side members, the support member having front and back faces;*

*further pivot means on said support member, said further pivot means at each end of said support member at an upper part thereof and pivotally engaged with said pivot means on said side members, said support member pivotal through approximately 180° forwardly and*

*upwardly from a position presenting said front face in a forward facing direction and said support member between said side members, to a position presenting said back face in a forward facing direction; and*

*a plurality of terminal clips extending through said support member, said clips having front ends extending*

*through the front face of the support member for the connection of conductor wires thereto and back ends extending through the back face of the support member for the connection of further conductor wires thereof.*

* * * * *